United States Patent
Lessmann

(10) Patent No.: US 10,554,724 B2
(45) Date of Patent: Feb. 4, 2020

(54) FIELD DEVICE, COMMUNICATION CHIP, AND METHOD FOR A WEB ACCESS TO A FIELD DEVICE

(71) Applicant: PHOENIX CONTACT GMBH & CO. KG, Blomberg (DE)

(72) Inventor: Gunnar Lessmann, Nieheim (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 621 days.

(21) Appl. No.: 14/780,527

(22) PCT Filed: Mar. 28, 2014

(86) PCT No.: PCT/EP2014/056297
§ 371 (c)(1),
(2) Date: Sep. 26, 2015

(87) PCT Pub. No.: WO2014/177327
PCT Pub. Date: Nov. 6, 2014

(65) Prior Publication Data
US 2016/0044085 A1    Feb. 11, 2016

(30) Foreign Application Priority Data

Mar. 28, 2013 (DE) .......................... 10 2013 103 242

(51) Int. Cl.
*H04L 29/08* (2006.01)
*H04L 29/06* (2006.01)
*H04L 12/40* (2006.01)

(52) U.S. Cl.
CPC ............ *H04L 67/025* (2013.01); *H04L 67/04* (2013.01); *H04L 69/03* (2013.01)

(58) Field of Classification Search
CPC ....... H04L 67/025; H04L 67/04; H04L 69/03; G05B 19/042

(Continued)

(56) References Cited

U.S. PATENT DOCUMENTS 7,058,693 B1   6/2006 Baker, Jr.
8,832,237 B2   9/2014 Merkel et al.
(Continued)

FOREIGN PATENT DOCUMENTS

DE   10 2009 027697 A1   1/2011
DE   10 2009 054901 A1   6/2011
(Continued)

OTHER PUBLICATIONS

Phoenix Contact GmbH & Co. KG, European Communication dated Jun. 12, 2017, from corresponding European Patent Application No. 14713838.2, with English translation, 12 pages.
(Continued)

*Primary Examiner* — Minh Chau Nguyen
(74) *Attorney, Agent, or Firm* — John Maldjian; Maldjian Law Group LLC

(57) ABSTRACT

The invention relates to a method for accessing a field device in order to simplify and/or improve web access to a field device. The field device is connected to a field bus designed for an Industrial Ethernet protocol or ProfiNET, and the method comprises transmitting a request from a web browser to a web server implemented in the field device, processing the received request in the field device by using a protocol stack of the Industrial Ethernet protocol, the protocol stack being stored in the field device, and transmitting response information from the web server to the web browser. The web server is implemented in the communication chip of the field device and both the communication with the controller and the web server use the same ProfiNET stack. The invention further relates to a field device designed to perform the method, and to a communication chip.

16 Claims, 2 Drawing Sheets

(58) Field of Classification Search
USPC .......................................................... 709/203
See application file for complete search history.

(56) References Cited

U.S. PATENT DOCUMENTS

| | | | |
|---|---|---|---|
| 2004/0230582 A1* | 11/2004 | Pagnano | G05B 19/4185 |
| | | | 707/999.1 |
| 2004/0236443 A1 | 11/2004 | Ware et al. | |
| 2006/0224250 A1* | 10/2006 | Callaghan | G05B 19/054 |
| | | | 700/1 |
| 2007/0199061 A1* | 8/2007 | Byres | H04L 41/0806 |
| | | | 726/11 |
| 2007/0226317 A1* | 9/2007 | Rydberg | H04L 67/12 |
| | | | 709/218 |
| 2010/0114334 A1* | 5/2010 | Krumsiek | G05B 19/042 |
| | | | 700/3 |
| 2012/0166609 A1 | 6/2012 | Lux et al. | |
| 2013/0208724 A1* | 8/2013 | Colucci | H04L 12/40169 |
| | | | 370/392 |
| 2014/0188933 A1* | 7/2014 | Chomik | H04L 67/125 |
| | | | 707/770 |
| 2014/0250153 A1* | 9/2014 | Nixon | G06F 17/30312 |
| | | | 707/812 |

FOREIGN PATENT DOCUMENTS

| | | |
|---|---|---|
| DE | 10 2010 063854 A1 | 7/2012 |
| EP | 1 175 062 A2 | 1/2002 |
| EP | 1 906 601 A1 | 4/2008 |
| EP | 2 538 500 A1 | 12/2012 |

OTHER PUBLICATIONS

International Search Report issued in connection with corresponding International Application No. PCT/EP2014/056297 dated Aug. 20, 2014 (12 pages total).

Chinese Office Action dated Dec. 19, 2016, issued in connection with corresponding Chinese Patent Application No. 201480019021. 6, with English language translation (24 pages total).

International Preliminary Report on Patentability with Written Opinion for International Application No. PCT/EP2014/056297 dated Oct. 8, 2015 (5 pgs.).

* cited by examiner

FIELD DEVICE, COMMUNICATION CHIP, AND METHOD FOR A WEB ACCESS TO A FIELD DEVICE

FIELD

The present invention generally relates to accessing field devices using web technologies, and more particularly relates to a method for accessing a field device, to a field device, and to a communication chip for use in a field device.

BACKGROUND

In automation technology, process-oriented field devices are employed for acquiring and/or influencing process parameters. For this purpose, field devices are connected to sensors and/or actuators, or they are configured as sensors or actuators.

Currently, Ethernet is entering field level. For example the communication standard PROFINET enables communication of real-time critical data and other TCP/IP communication on one line at the same time. One application of TCP/IP communication is the configuration, monitoring and diagnosis of field devices using web technologies such as http or JavaScript. When PROFINET is employed, users may also use adjustment and diagnosis options via the already existing Ethernet interface of the device using a web browser.

Usually, a so-called PROFINET protocol stack is running in a PROFINET field device on a communications chip, such as e.g. an ERTEC chip from Siemens. This stack processes the PROFINET communication protocol independently. The stack provides its services at an application interface. These services allow a device application to read and write cyclic process data or acyclic parameter values.

Field devices are known which are provided with a web server for processing requests of an operation device provided with a web browser. By addressing the respective field device via an assigned URL address, visualization of information of the respective field device is possible in this way.

For implementing such a web access to a field device, the device manufacturer has to deal with details on web servers and web technologies concerning his device since the device application requires an interface to the web server. However, this is generally not a core competence of field device manufacturers. In addition, the web server requires additional computing power that will no longer be available for the device application.

When providing a web access, access conflicts may occur if for example a control unit such as a Programmable Logic Controller (PLC) and a web browser try to access a field device at the same time. These access conflicts have to be solved at the interface to the application. Furthermore, with the evolution from IPv4 to IPv6 the entire device architecture has to be adapted.

SUMMARY

Embodiment of the present invention are based on finding a way how to simplify and/or improve web access to a field device, and in particular how drawbacks of the solutions known from prior art can be avoided or reduced.

An embodiment of the present invention is to present the web representation vis-à-vis the device application of a field device as an Industrial Ethernet interface, in particular as a PROFINET interface. For this purpose, an application interface is provided for communicating with the device application, and at the application interface an Industrial Ethernet protocol stack, in particular a PROFINET protocol stack, provides its services and enables the device application to read and write cyclic process data or acyclic parameter values. The application interface includes a separate logical interface associated with the web server, so that the communication between the web server and the device application is not effected via a direct interface, but via the Industrial Ethernet protocol stack.

The technical problem mentioned above is firstly solved by the features of claim 1.

Accordingly, in another embodiment of the present invention, there is provided a method for accessing a field device is provided, which field device is connected to a field bus adapted for an Industrial Ethernet protocol. The method comprises transmitting a request from a web browser to a web server executed in the field device, which web browser is being executed in an operation device connected to the field bus. The received request is processed in the field device using a protocol stack of the Industrial Ethernet protocol stored in the field device, and response information is transmitted from the web server back to the web browser.

Generally, Industrial Ethernet refers to an Ethernet protocol for use in automation and process environment, which meets specific real-time requirements and which is therefore also referred to as real-time Ethernet. The generic term Industrial Ethernet encompasses a variety of protocols such as PROFINET, SERCOS III, SafetyNET p, VARAN, EtherNet/IP, Ethernet Powerlink, or EtherCAT.

Various types of requests may be contemplated, each of which serves different purposes, such as monitoring, visualization, parameterization, operation, or even engineering. Accordingly, the processing of the received request in the field device advantageously comprises providing process data, adjusting at least one parameter, and/or creating, editing, and/or executing a function of a device application.

In principle, communication between the web browser and the web server is effected via the transactional Hypertext Transfer Protocol (http), a transaction being started by the web browser as a client by generating a request and sending the request to the web server. The web server completes the transaction by generating a response and sending it back to the client. Preferably, the web server provides the response in form of a web page. Modern browsers provide the option, via a mechanism referred to as XMLHttpRequest, to send http requests directly from a JavaScript application running in the browser, and to receive http responses.

In another embodiment, the processing of the received request in the field device comprises forwarding the request from the web server to an application interface connected to a device application executed in the field device via the Industrial Ethernet protocol stack stored in the field device, and transmitting a response to the request from the application interface to the web server via the protocol stack. For this purpose, the application interface advantageously comprises an individual logical interface associated with the web server, and the web server acts as an Industrial Ethernet client vis-a-vis the application interface.

A parameterization memory may be provided in the field device, in which a parameter file is stored, for example. In this case, the processing of the received request in the field device may furthermore advantageously comprise accessing this parameterization memory. Such a parameterization memory further provides the particular advantage that a parameter file may be copied to other devices of the same type via Ethernet protocols, such as FTP. In this manner, other devices may simply be supplied with the same parameters.

When starting up the device application, the parameters stored in the parameterization memory are supplied to the device application as initial values via appropriate write services, to be kept consistent in case of changes. In this manner, the device application does not have to implement its own parameter storage.

A PROFINET protocol is used as an Industrial Ethernet protocol, so that, accordingly, the protocol stack stored in the field device is a PROFINET protocol stack.

The technical problem mentioned above is furthermore solved by the features of claim 8.

In another embodiment, a field device is provided, which is configured for being operated on a field bus adapted for an Industrial Ethernet protocol, which field device comprises at least one Ethernet interface for being connected to the field bus, a web server connected to the Ethernet interface, a memory having a protocol stack of the Industrial Ethernet protocol stored therein, and an application interface for communicating with a device application executable on the field device, wherein the application interface is adapted for communicating with the web server using the protocol stack of the Industrial Ethernet protocol stored in the field device.

As described above, the application interface advantageously comprises an individual logical interface associated with the web server and is adapted to treat the web server as an Industrial Ethernet client. In a preferred embodiment, the field device is configured as a PROFINET field device, and accordingly the stored protocol stack is a PROFINET protocol stack.

In another embodiment, the field device comprises at least two separate integrated circuits, briefly referred to as chips below. These are a communication chip and an application chip. The communication chip is connected to the at least one Ethernet interface and is adapted for executing the web server, the Industrial Ethernet protocol stack and the application interface, whereas the application chip is adapted to execute a device application connectable to the application interface. Advantageously, the communication chip may further comprise a parameterization memory.

By using separate chips it is ensured that the Industrial Ethernet communication does not affect the application.

The technical problem mentioned above is furthermore solved by the features of claim 14.

in another embodiment, a communication chip is provided for use in a field device as described above, which communication chip comprises a web server, a memory having a protocol stack of an Industrial Ethernet protocol stored therein, and an application interface for communicating with a device application executed in the field device, wherein the application interface is adapted for communicating with the web server using the protocol stack of the Industrial Ethernet protocol, and wherein in particular the stored protocol stack is configured as a PROFINET protocol stack.

BRIEF DESCRIPTION OF THE DRAWINGS

The present invention will now be described in more detail by way of preferred exemplary embodiments and with reference to the accompanying drawings. The same reference numerals in the drawings refer to the same or to similar parts. In the drawings.

DETAILED DESCRIPTION

Figure 1:
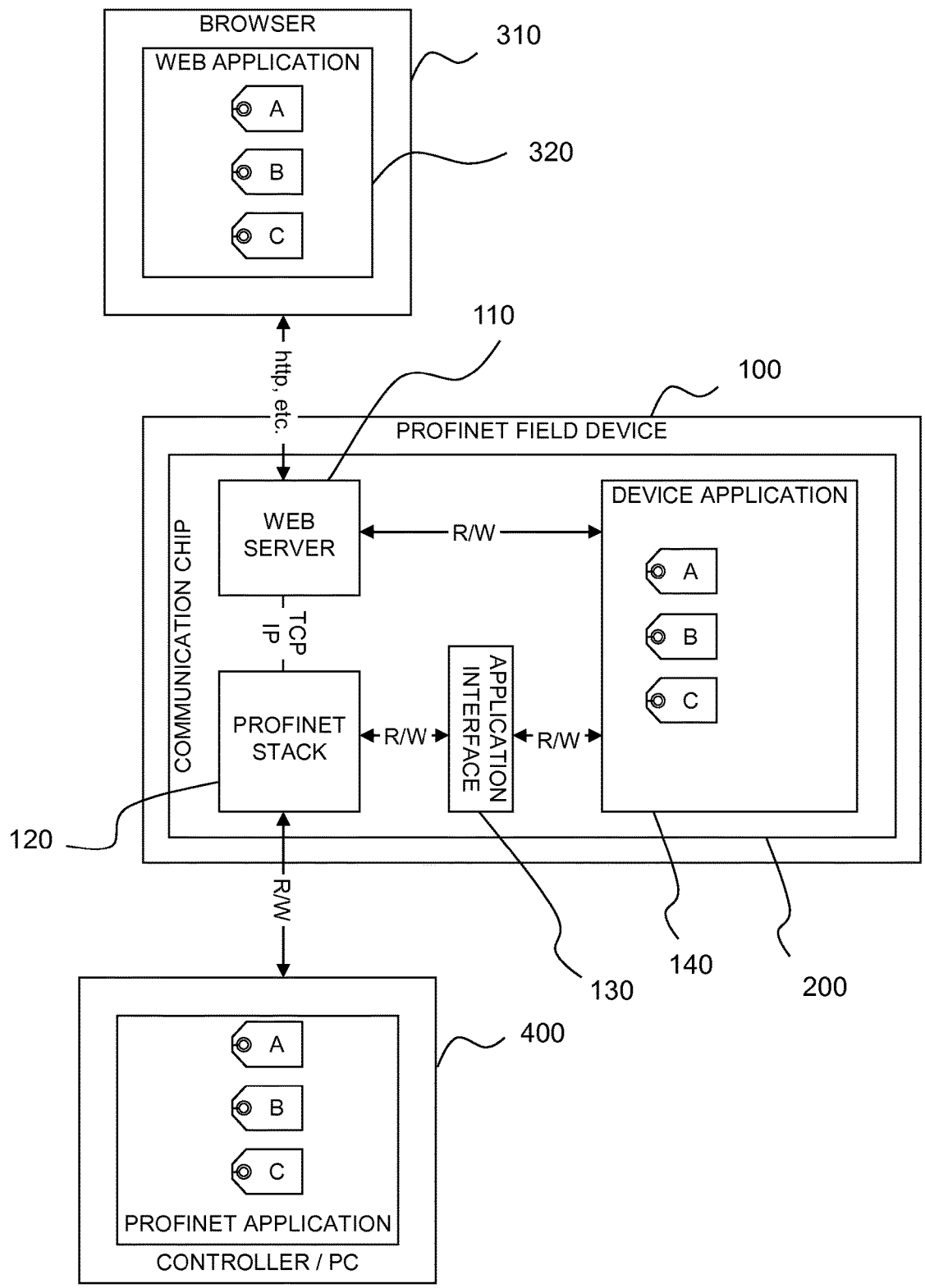
FIG. 1 is a schematic diagram of a web-based access to a field device according to the prior art.

In the example of a field device 100 known from the prior art and illustrated in FIG. 1, three parameters "A", "B", and "C" are shown, which can be read and written cyclically or acyclically by a controller 400. For this purpose, a PROFINET stack 120 and an application interface 130 are provided. A web access to field device 100 is performed by a web browser 310 using a corresponding counterpart in form of a web server 110 on the device side. In this web browser 310, the same parameters may be represented, for example in a web application 320, for example for diagnosis or initial start-up purposes. For this purpose, web server 110 communicates directly with device application 140. Typically, components 110, 120, 130, and 140 are arranged on a common communication chip 200.

Figure 2:
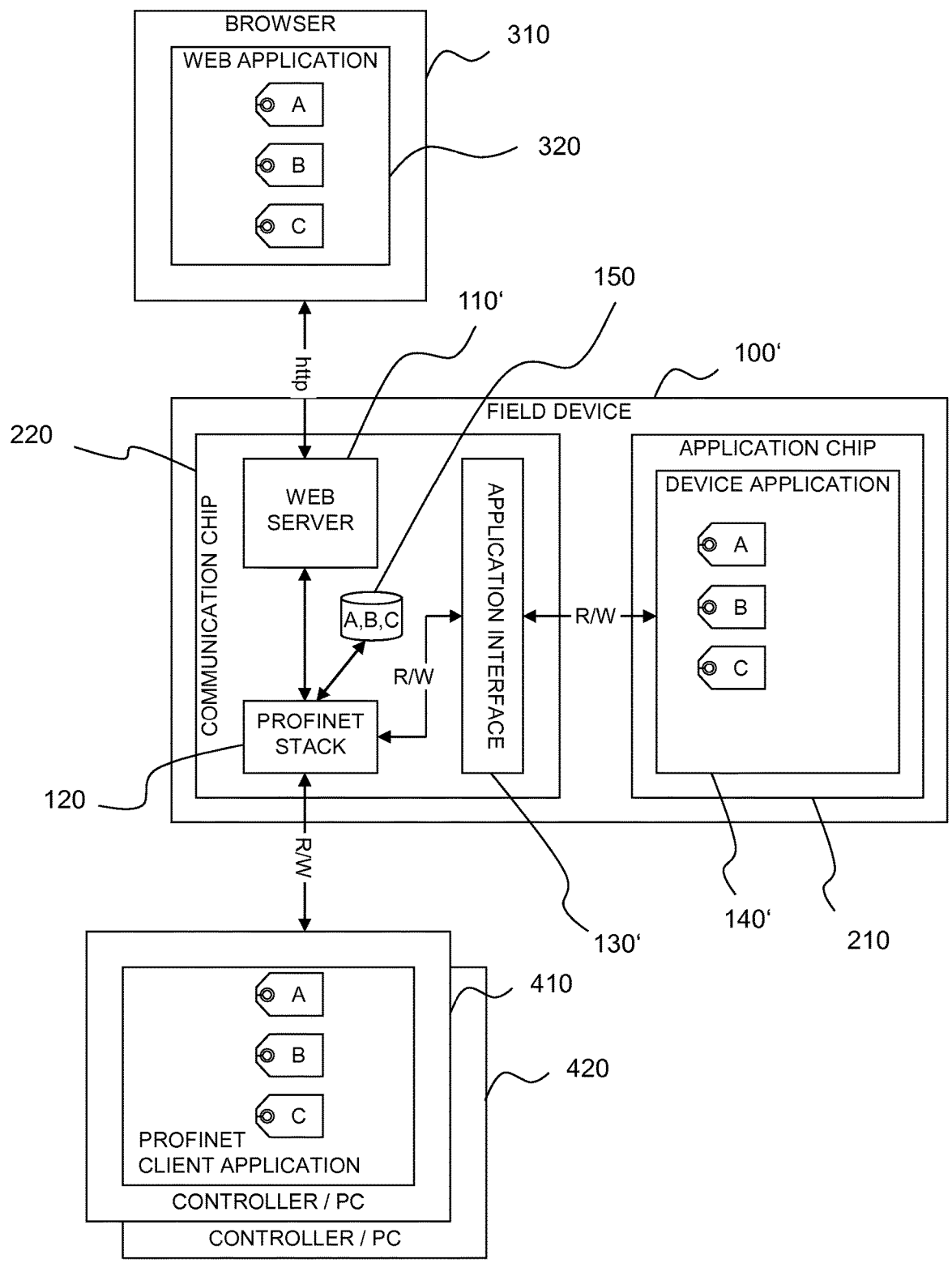
FIG. 2 is a schematic diagram of a web-based access to a field device according to an embodiment of the present invention.

In the exemplary field device 100' illustrated in FIG. 2, by contrast, communication and application is separated, and for this purpose in particular communication chips are used, such as the Tiger chip from Phoenix Contact.

A PROFINET stack 120 is executed on a communication chip 220, and device application 140' is executed on a separate chip 210 with appropriate processing power. This ensures that the PROFINET communication does not affect the device application. In the illustrated exemplary embodiment, the PROFINET application interface is provided at an appropriate hardware interface of chip 220. Via this interface, device application 140' may exchange its parameters with a controller or PC 410 or 420 via cyclic or acyclic services.

Since PROFINET allows simultaneous access to a device from a plurality of controllers or PCs 410 or 420, each of these so-called clients has an individual area reserved at application interface 130' provided for communication with application 140', to be identified by application 140'. In other words, the application interface comprises a separate logical interface for each client.

For example, a separate area or a separate logical interface is provided for each accessing PLC, and a further area for a so-called supervisor which is executed on a PC, for example. By using these areas, the respective clients 410 or 420 may separately access application 140'. Below, it shall be assumed that a PLC 410 and a supervisor 420 executed on a PC are provided.

An important aspect of the present invention is to execute a web server 110' on communication chip 220, which is responsible for the manufacturer-specific representation of device parameters. By using web techniques such as JavaScript it is possible to store the design independently of the representation of the parameter values.

Vis-à-vis device application 140', the access of web server 110' to the parameter values is represented by a respective individual area, similar to the access of a further PROFINET client such as the supervisor.

For example, if a user changes the value of parameter "B" in a web application 320 executed in web browser 310, the request for write access to the corresponding parameter will be communicated to application 140'. The same applies for the purpose of simply displaying value "A", for example. In this case, a read access to the corresponding parameter is signaled to application 140'. The nature of these accesses is identical to the access of other PROFINET clients.

The use of a separate area in the application interface for the web access is particularly advantageous in the case that, for example, no other client such as a PLC 410 or a supervisor 420 exists for initial operation. So if no PLC 410 or supervisor 420 accesses device 100', the web server 110' can take over complete control without requiring special measures in device application 140'. This allows to retrofit web functionality in communication chip 220 without need to adapt device application 140'.

Moreover, it is conceivable that the device parameters are stored on communication chip 220, for example in a file 150. When starting up application 140', these parameters are supplied to application 140' as initial values, via appropriate write services, to be kept consistent in case of changes. In this manner, device application 140' does not have to implement its own parameter storage. Parameter file 150 may further be copied to other devices of the same type via other Ethernet protocols, such as FTP. In this manner, further devices can be simply supplied with the same parameters.

Furthermore, another embodiment of a field device according to the invention is conceivable, in which web server 110', PROFINET stack 120, and application 140' are executed on one communication chip, i.e. no separate communication and application chips are provided.

The present invention provides a number of advantages, in particular when using separate communication and application chips.

For example, the device application does not have to deal with the presentation of the web contents. Therefore, the application developer does not need to have deep knowledge of web technologies. Moreover, no memory and computational resources of the application are required for the execution of the web server. Thus, the application chips are preferably cost-efficient and there is no interaction with the device application.

Furthermore, multiple accesses and access conflicts are managed in the communication chip, so that the application does not need to take special measures in this respect.

The presentation of the web contents may be developed and also changed separately from the device application, if the device parameters are already provided via PROFINET. Therefore, the retrofitting of a web interface for existing devices and applications is easily possible.

Advantageously, the complete on-site initial start-up of a device may be performed via the web interface. Access conflicts with another client application are solved by the communication chip. The PROFINET specification includes appropriate mechanisms which will, for example, signal a PLC that the requested resource is occupied by another client. The device application does not need to take special measures for this purpose.

Furthermore, parameter storage on the communication chip on behalf of the device application is possible, as well as a simple transmission of parameter values to other field devices without requiring the device application to take any special measures.

A transition from IPv4 to IPv6 is possible without impact on the device application. The same applies to secure data transmission, such as https or VPN tunneling.

The invention claimed is:

1. A method for accessing a field device which is connected to a field bus adapted for an Industrial Ethernet protocol, comprising:
   transmitting a request from a web browser to a web server implemented in the field device, said web browser being executed in an operation device connected to the field bus, wherein the communication between the web browser and the web server is effected via the hypertext transfer protocol;
   processing the received request in the field device by using a protocol stack of the Industrial Ethernet protocol, said protocol stack being stored in the field device, wherein the processing of the received request in the field device comprises forwarding the request from the web server, via the Industrial Ethernet protocol stack, to an application interface which is connected to a device application executed in the field device, and transmitting a response to the request from the application interface to the web server via the protocol stack, wherein the application interface comprises an individual logical interface associated with the web server and the web server acts as an Industrial Ethernet client towards the application interface; and
   transmitting response information from the web server to the web browser.

2. The method as claimed in claim 1, wherein the processing of the received request in the field device comprises accessing a parameterization memory of the field device.

3. The method as claimed in claim 2, wherein a PROFINET protocol is used as the Industrial Ethernet protocol, and wherein the protocol stack stored in the field device is a PROFINET protocol stack.

4. The method as claimed in claim 1, wherein the processing of the received request in the field device comprises:
   providing process data;
   adjusting at least one parameter; and/or
   creating, editing and/or executing a function of a device application.

5. The method as claimed in claim 1, wherein a PROFINET protocol is used as the Industrial Ethernet protocol, and wherein the protocol stack stored in the field device is a PROFINET protocol stack.

6. The method as claimed in claim 1, wherein the response information is provided by the web server in form of a web page.

7. A field device configured for being operated on a field bus adapted for an Industrial Ethernet protocol, comprising:
   at least one Ethernet interface for being connected to a field bus;
   a web server connected to the Ethernet interface, wherein said web server is adapted to communicate with a web browser via a hypertext transfer protocol, said web browser being executed in an operation device connected to the field bus;
   a memory having a protocol stack of the Industrial Ethernet protocol stored therein; and
   an application interface for communicating with a device application executed on the field device, wherein the application interface is adapted to communicate with the web server using the protocol stack of the Industrial Ethernet protocol stored in the field device, wherein the application interface comprises an individual logical interface associated with the web server and is adapted for communicating with the web server as an Industrial Ethernet client.

8. The field device as claimed in claim 7, wherein the stored protocol stack is a PROFINET protocol stack.

9. The field device as claimed in claim 8, wherein the web server is adapted to receive requests from the web browser and to provide response information in the form of a web page.

10. The field device as claimed in claim 7, wherein the web server is adapted to receive requests from the web browser and to provide response information in form of a web page.

11. The field device as claimed in claim 10, further comprising a communication chip connected to the at least one Ethernet interface, and an application chip, wherein the communication chip is adapted to execute the web server, the Industrial Ethernet protocol stack and the application interface, and the application chip is adapted to execute the device application connectable to the application interface.

12. The field device as claimed in claim 7, comprising a communication chip connected to the at least one Ethernet interface, and an application chip, wherein the communication chip is adapted to execute the web server, the Industrial Ethernet protocol stack and the application interface, and the application chip is adapted to execute a device application connectable to the application interface.

13. The field device as claimed in claim 12, wherein the communication chip further comprises a parameterization memory.

14. The field device as claimed in claim 12, wherein the communication chip further comprises a parameterization memory.

15. A communication chip for use in a field device as claimed in claim 7, comprising:
- a web server adapted to communicate with a web browser via the hypertext transfer protocol;
- a memory having a protocol stack of an Industrial Ethernet protocol stored therein; and
- an application interface for communicating with a device application executed in the field device, wherein the application interface is adapted to communicate with the web server using the protocol stack of the Industrial Ethernet protocol, wherein the application interface comprises an individual logical interface associated with the web server and is adapted for communicating with the web server as an Industrial Ethernet client.

16. The communication chip as claimed in claim 15, wherein the stored protocol stack is a PROFINET protocol stack.

* * * * *